Patented Feb. 28, 1950

2,498,777

UNITED STATES PATENT OFFICE 2,498,777

COMPOSITION TO IMPROVE CIRCULATION OF BLOOD IN VASCULAR DISORDERS

Rudolph R. Widmann, Beverly Hills, Calif., assignor to Organic Chemicals, Inc., Pasadena, Calif., a corporation of California No Drawing. Application November 6, 1947, Serial No. 784,510

2 Claims. (Cl. 167—55)

This invention relates to new compositions of matter and novel combinations thereof which produce the new and beneficial result of improving the circulation of the blood and lymph in the tissues of areas affected by various vascular disorders; and to methods of manufacturing or combining these compositions of matter to achieve these and other new and beneficial results.

The preferred embodiment of my invention is a combination of (1)-histidine or its hydrochloride salt with pyridoxine or its hydrochloride salt to produce histamine or histamine-like substances within the tissues of the human body.

For the sake of brevity herein I will always refer to (1)-histidine or its hydrochloride salt as "histidine"; I will always hereinafter refer to pyridoxine or its hydrochloride salt as "pyridoxine"; and I will always refer to histamine or histamine-like substances as "histamine."

Also, by the term "pyridoxine" herein I will include each of the following descriptive words or phrases: Vitamin B-6 and its hydrochloride salt, also known as adermin, shown to be identical with the factor Y of Chick and Copping, the antidermatitis factor of Hogan and Richardson, the "vitamin H" of Booher, and the factor I of Lepkovsky, Jukes and Krause, closely related to codecarboxylase of bacterial amino-acid decarboxylases, and designated by the Council on Pharmacy and Chemistry of the American Medical Association as pyridoxine, a name first proposed by György and Eckhardt in 1939 and having the following chemical structure and designation:

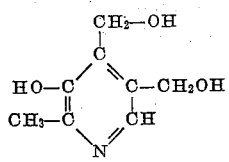

(2-methyl-3-hydroxy-4,5-di-(hydroxymethyl)-pyridine)

Pyridoxine is found in dried yeast, liver, rice polishings, meat, fish, whole wheat and corn and has been used as a catalyst of coenzyme activity for the enzyme histidine decarboxylase of Werle and Holtz successfully. The resulting decarboxylation product of histidine, i. e., histamine, has been found in strong concentration in the urine of human beings who are being treated for vascular disorders. I have given pyridoxine and the mother-substance of histamine, histidine, orally or parenterally to patients with excellent clinical results.

It has been demonstrated that pyridoxine and related compounds, that is, pyridoxal and pyridoxamine, are converted into codecarboxylase, the coenzyme of various bacterial amino acid apodecarboxylases, such as lysine and tyrosine apodecarboxylases, but excluding histidine decarboxylase for which no coenzyme has yet been discovered, by the organisms capable of using them. This coenzyme, which has been synthesized from pyridoxal, is believed to be a phosphorylated derivative of pyridoxal.

In the clinical use, so far human disease processes are concerned, this factor, to be known hereinafter as pyridoxine, has been used as the activating factor of the tissue decarboxylating enzyme of Werle and Holtz and not the bacterial decarboxylating enzyme first demonstrated by Ackermann in 1910 and shown by Gale in 1941 for Clostridium welchii at least to have an optimum pH between 2.5 and 3.0 and to be inactive at a pH above 6.9.

Histidine and pyridoxine will not produce the results of my invention if they are associated with gelatine; thiamine hydrochloride; liver extract; glycine; ferric or ferrous salts; anti-histamine compounds (such as pyribenzamine; benadryl, etc.); epinephrine and related compounds; bile salts; heavy metals (such as copper, manganese, iron, etc.) or other inhibitors (such as certain aldehydes, e. g. formaldehyde, that inactivate histamine).

My invention is the administration of histidine and pyridoxine in powdered, crystalline or liquid form. In former administrations of histidine to human beings it was always by injection of the liquid form. I was the first to administer histidine orally in either the powdered or liquid form and I was the first to administer histidine with pyridoxine to transform the histidine into histamine to combat vascular disorders.

I have invented two novel methods of successfully treating vascular diseases. My preferred method is to administer orally my novel powdered product, which is herein described in detail. Another method is to inject separately proper dosages of liquid histidine and liquid pyridoxine. Preferably the dosage of liquid histidine is injected in one area such as one hip and the dosage of pyridoxine is injected in a different area of the body, such as the other hip, though this is not necessary.

My novel powdered composition of matter may be in any crystalline form such as powder, which may be called a "package," or tablets or pills made by compressing the powder with a suitable binding agent, which I will hereinafter refer to as a "solid package." Also it may consist of separate dosages of histidine and pyridoxine or a single composition of the correct dosages of both histidine and pyridoxine.

The preferred embodiment of my invention is a package that is preferably made by combining and mixing proper dosages of crystalline histidine and crystalline pyridoxine.

Crystalline histidine is vastly superior to liquid histidine which cannot be used for the same purposes as the crystalline histidine. For instance a tablet or pill cannot be made from liquid histidine. Also, liquid histidine must be administered in sterile form in an ampule, which is very expensive. The crystalline form has a great advantage in that it does not have to be dissolved or put in a sterile form or placed in an ampule and therefore it is much less expensive.

Of course the tablet or pill can be in turn made into a liquid which need not be sterile in an ampule, and administered orally but that would make it even more expensive.

A dosage of the product which is my invention which has proven satisfactory has been made by mixing 200 milligrams of powdered histidine and 12½ milligrams of powdered pyridoxine, though other proportions will work and I do not wish to be limited to any specific relative proportions. These powders are preferably mixed or combined with a suitable binding agent and then pressed into a tablet in the preferred embodiment of my product.

A suitable binding agent is starch or starch in combination with sugar or dextrose. These binding agents are combined with the other ingredients using magnesium stearate, calcium stearate or talc as a lubricant. After the suitable binding agent has been combined with the other elements the resultant composition of matter using the magnesium stearate as a lubricant is in a suitable condition to be compressed into either a tablet or a pill for convenience in administration.

I am the first to administer separate injections of liquid histidine and pyridoxine or to administer separate or combined powdered compounds, either as powder, tablets or pills, of histidine and pyridoxine to be taken orally for the purpose of improving the circulation in vascular disorders.

These separate injections of liquid histidine and pyridoxine and these oral administrations of a package consisting of combination or compositions of histidine and pyridoxine have produced new and beneficial results such as improving the circulation of blood and lymph in vascular disorders.

Crystalline histidine has never been administered to human beings before I did it. This also is broadly new with me. The crystalline histidine may be administered alone if sufficient quantities of food rich in pyridoxine are administered sufficiently contemporaneously to cause the histidine to be transformed into histamine. Also the histidine may be administered without food if sufficient quantities of crystalline pyridoxine are administered sufficiently contemporaneously to cause the histidine to be transformed into histamine.

My preferred embodiment is to combine the crystalline histidine and the crystalline pyridoxine in a composition of matter consisting of a powder, a tablet or a pill containing the preferred ingredients.

The preferred range of histidine for each dose is from two hundred to six hundred milligrams and the preferred range of dosage of pyridoxine is from five to fifty milligrams. Various combinations within these ranges can be made but the preferred single dosage that covers the largest number of average cases is in the ratio of four hundred milligrams of histidine to twenty-five milligrams of pyridoxine. Naturally the percentages within the preferred ranges may be varied according to the stage or severity of the disorder of the particular patient being treated.

While I have described in some detail presently preferred embodiments of my product and presently preferred methods of performing my invention, it is to be understood that various modifications may be made therein within the scope of the subsequently appended claims.

I claim:

1. A composition of matter consisting essentially of a mixture of crystalline histidine and crystalline pyridoxine.

2. A composition of matter consisting essentially of a mixture of from about 200 to about 600 parts by weight of histidine and from 5 to about 50 parts by weight of pyridoxine.

RUDOLPH R. WIDMANN.

REFERENCES CITED

The following references are of record in the file of this patent:

Hirschfield: Archives of Otolaryngology, vol. 44, Dec. 1946, pages 686, 687.

U. S. Dispensatory, 23rd ed. (1943), page 1577.

Ruskin: Amer. Jour. of Digestive Diseases, vol. 11, pages 209 to 223 (July 1944).

Chemical Abstracts, vol. 38, page 1002 (1944).

Goodman and Gilman: Pharmacological Basis of Therapeutics (1941), page 566.